April 8, 1958 R. T. OETERS 2,829,483
HANDLE FOR LAWN MOWERS
Filed July 10, 1956
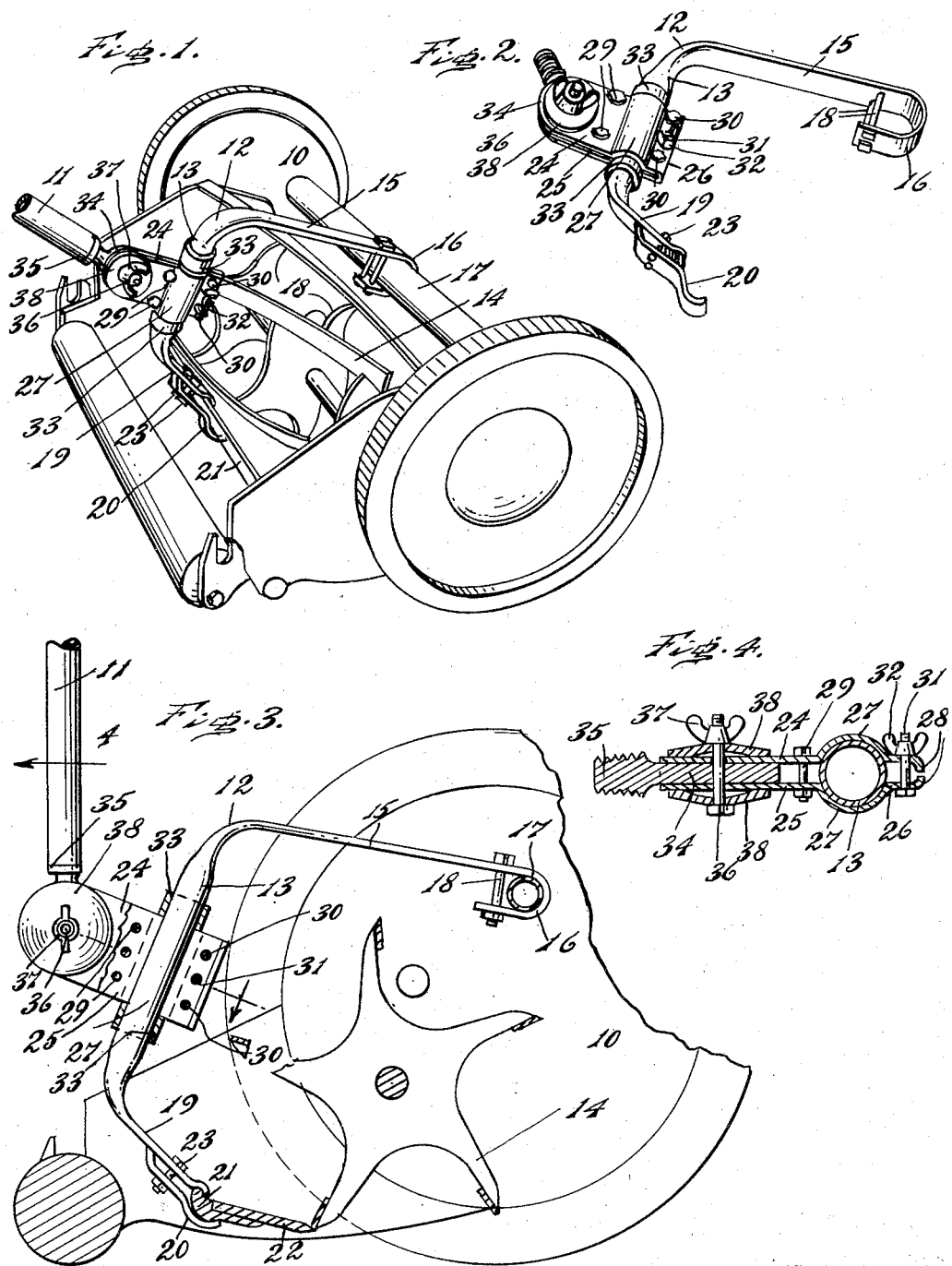
INVENTOR
Richard T. Oeters
BY
Jas. C. Nobensmith
ATTORNEY United States Patent Office 2,829,483
Patented Apr. 8, 1958

2,829,483

HANDLE FOR LAWN MOWERS

Richard T. Oeters, Philadelphia, Pa.

Application July 10, 1956, Serial No. 596,967

5 Claims. (Cl. 56—249)

This invention relates to lawn mowers, and it relates more particularly to improved means for attaching the handle of a lawn mower of the reel type of the cutting unit.

More specifically considered, my invention relates to certain improvements in the means for connecting to a lawn mower, of the reel type, a handle such as is described and shown in my previous application for Letters Patent filed January 10, 1955, Serial No. 480,833.

Lawn mowers, of the reel type, are each usually provided with a bail member pivotally connected to the side portions of the cutting unit of the mower, and the handle is ordinarily connected rigidly to such bail member.

However, in connection with certain improvements heretofore made by me relating to the handle portions of lawn mowers, certain difficulties arose in connecting said handles to the bail members ordinarily provided for the lawn mowers, which were not suitable for the attachment of such improved handles to the cutting units of the mowers.

Accordingly, various attempts were made to provide other bail members which could be substituted for those ordinarily supplied with the common types of reel cutter lawn mowers, whereby my improved forms of handles could be applied to the cutting units of existing mowers.

After considerable experimentation, it occurred that the form of handle attachment shown in my aforesaid patent application for Letters Patent, Serial No. 480,833, would be much more useful if the usual form of bail member was discarded, and different means for connecting the handle to the cutter unit of the mower was provided.

The principal object of the present invention is to provide improved means for the pivotal connection of a handle staff to the cutting unit of a lawn mower, which is so constructed and arranged that the same may be applied to a wide variety of styles and sizes of mowers, of the reel type, and which will be simple, efficient and inexpensive in its construction.

A further object of the invention is to provide improved means for connecting the handle staff of a lawn mower to the cutting unit thereof, which is particularly adaptable for use with handle staffs which are pivotally connected to the cutting unit in such manner as to facilitate the use of the mower on high and inclined banks, and at other places where it is difficult to use a mower of the ordinary type.

The nature and characteristic features of the present invention will be more readily understood from the following description, taken in connection with the accompanying drawing forming part hereof, in which:

Figure 1 is a perspective view of a cutting unit of a lawn mower, of the reel type, having improved means embodying the present invention for connecting the handle staff to the cutting unit;

Fig. 2 is a perspective view of the principal novel parts of the device of the present invention, detached;

Fig. 3 is an enlarged fragmentary cross-section of the cutting unit of a lawn mower, with the device of the present invention applied thereto; and Fig. 4 is an enlarged section taken on the line 4—4 of Fig. 3, a part of the handle portion being swung to bring the axis thereof in alinement with the axis of other parts of the connecting device.

It should, of course, be understood that the description and drawing herein are illustrative merely, and that various modifications and changes may be made in the construction and arrangement shown without departing from the spirit of the invention.

Referring to the drawing, in the particular embodiment of the invention therein shown, the cutting unit 10 of the lawn mower is of the rotating reel type, to which the staff portion 11 of the handle is connected by a bail member 12 having its main transverse portion 13 disposed in a plane at right angles to the axis of the cutter reel 14 of the mower.

The transverse portion 13 of the bail member is preferably made of a tubular pipe, having its end portions flattened and shaped as hereinafter set forth.

One end portion 15 of the bail member extends forwardly and has its extremity bent around and formed into U-shape as at 16 to engage the stay rod or bar 17 usually provided as a part of the framework of the cutting unit of the mower. Fastening bolts 18 extend through suitable apertures in the bent-over extremity 16 of the end portion 15 of the bail member.

The other end portion 19 of the bail member extends forwardly and downwardly. At the forward extremity of the portion 19 of the bail member there is provided a clamping plate 20 suitably shaped, whereby the portion 21 of the framework of the cutting unit of the mower, which supports the rear stationary flat knife 22 at the lower rear part of the mower may be gripped for the purpose of securing the end portion 19 to the bail member 12 at that point. Bolts 23 are employed to secure the clamping plate 20 and thus effect the clamping action.

For the purpose of securing the staff portion of the handle to the bail member 12 there is provided a connecting device similar to that shown in my previous application, Serial No. 480,833, including a pair of plates 24 and 25 each having an extending portion 26, suitably curved as at 27 to encompass the central portion 13 of the bail member 12, and having extending lip portions 28 on one side of the central portion 13 of the bail member.

The plates 24 and 25 are secured to each other adjacent the curved portions 27, which encompass the central portion 13 of the bail member, by bolts 29. The lip portions 28 of the plate members 24 and 25 may also be provided with similar bolts 30 near the corners or side edges thereof.

There is also provided, intermediate the sides of the lip portions 28, a bolt 31 having a wing nut 32 threaded thereon by means of which the frictional gripping action of the curved portions 27 which encompass the central portion 13 of the bail member 12, may be adjusted to the desired degree.

The central portion 13 of the bail member may be provided with collars 33 which are adapted to prevent said plate members 24 and 25 from sliding on the central portion 13 of the bail member.

The plate members 24 and 25 are suitably spaced with respect to each other for the positioning therebetween of an ear 34 of a pivotal member having a threaded extension 35 by means of which the staff portion 11 of the handle is secured thereto.

The pivot bolt 36 extends through the plate members 24 and 25 and through the ear 34 of the pivotal member. A wing nut 37 is threaded on the end of said bolt 36. Preferably, a pair of dished washers 38 are employed, one on each outer face of the plate members 24 and 25. One of said washers 38 is engaged by the head of the pivot bolt 36, and the other is engaged by the wing nut 37, the arrangement being such that by adjustment of the wing nut 37 the proper degree of frictional gripping action between the parts will be obtained, so that the staff of the handle structure will be normally maintained in desired angular relationship with respect to the cutting unit, yet the same may be readily shifted by the operator by obvious manipulation of the staff portion of the handle to bring the same to other and different angular relationships as may be desired.

The staff of the handle may be of any preferred construction, for example, it may be made of a series of telescopic tubes, adapted to be adjusted lengthwise with respect to each other in a manner such as is shown and described in my previous application for Letters Patent, Serial No. 499,081.

By the foregoing arrangement there is provided novel means for connecting the staff portion of a lawn mower handle to the cutter mechanism whereby, after proper adjustment of the wing nuts, the handle may be caused to assume, more or less automatically, various desired angular relationships with respect to the cutter portion of the mower, whereby when the staff is extended, the mowing of grass upon more or less inaccessible places, such as high banks or terraces, and under low hanging trees and shrubbery may be readily accomplished.

More particularly, the device of the present invention will permit the attachment of the staff portions of the lawn mower handles to the cutting units of lawn mowers of various styles and sizes, without requiring any special adjustment of the parts of the bail member with respect to each other, and without requiring any great amount of skill in applying the same.

I claim:

1. In a lawn mower of the reel type, the means for connecting the staff of the handle to the cutting unit which comprises a bail member having a central portion disposed in a vertical plane at right angles to the axis of the reel, said bail member having an arm extending forwardly from the central portion and secured to a portion of the cutting unit, and having another arm extending forwardly and secured to another portion of the cutting unit, and a universal joint device for connecting the staff to the central portion of the bail member.

2. In a lawn mower of the reel type having a stay bar extending parallel to the axis of the reel, and a frame member for supporting the stationary knife of the cutting unit extending parallel to said stay bar, the means for connecting the staff of the handle to the cutting unit which comprises a bail member having a central portion the axis of which is disposed in a vertical plane at right angles to the axis of the reel, said bail member having an arm extending forwardly from said central portion and secured to the stay bar, and having another arm extending forwardly and secured to the frame member which is provided for supporting the stationary knife of the cutting unit, and a universal joint device for connecting the staff to the central portion of the bail member under frictional restraint.

3. In a lawn mower of the reel type having a stay bar extending parallel to the axis of the reel, and a frame member for supporting the stationary knife of the cutting unit extending parallel to said stay bar, the means for connecting the staff of the handle to the cutting unit which comprises a bail member having a central portion of circular cross-section the axis of which is disposed in a vertical plane at right angles to the axis of the reel, said bail member having an arm extending forwardly from said central portion and secured to the stay bar, and having another arm extending forwardly and secured to the frame member which is provided for supporting the stationary knife of the cutting unit, a universal joint device for connecting the staff to the central portion of the bail member under adjustable frictional restraint.

4. In a lawn mower of the reel type having a stay bar extending parallel to the axis of the reel, and a frame member for supporting the stationary knife of the cutting unit extending parallel to said stay bar, the means for connecting the staff of the handle to the cutting unit which comprises a bail member having a central portion of circular cross-section the axis of which is disposed in a vertical plane at right angles to the axis of the reel, said bail member having an arm extending forwardly from said central portion and secured to the stay bar, and having another arm extending forwardly and secured to the frame member which is provided for supporting the stationary knife of the cutting unit, a device rotatably mounted under frictional restraint upon the central portion of the bail member, a member to which the staff of the handle is secured, said member being pivotally connected under frictional restraint to the aforesaid rotatably mounted device on an axis substantially at right angles to the axis of rotation of said device.

5. In a lawn mower of the reel type having a stay bar extending parallel to the axis of the reel, and a frame member for supporting the stationary knife of the cutting unit extending parallel to said stay bar, the means for connecting the staff of the handle to the cutting unit which comprises a bail member having a central portion of circular cross-section the axis of which is disposed in a vertical plane at right angles to the axis of the reel, said bail member having an arm extending forwardly from said central portion and secured to the stay bar, and having another arm extending forwardly and secured to the frame member which is provided for supporting the stationary knife of the cutting unit, a device rotatably mounted under adjustable frictional restraint upon the central portion of the bail member, a member to which the staff of the handle is secured, said member being pivotally connected under adjustable frictional restraint to the aforesaid rotatably mounted device on an axis substantially at right angles to the axis of the rotation of said device.

References Cited in the file of this patent

UNITED STATES PATENTS

| | | |
|---|---|---|
| 456,472 | Braun et al. | July 21, 1891 |
| 2,653,381 | Rooke | Sept. 29, 1953 |